United States Patent [19]
Effenberger et al.

[11] 3,907,837
[45] Sept. 23, 1975

[54] PRODUCTION OF AROMATIC KETONES

[75] Inventors: Franz Effenberger, Stuttgart-Sonnenberg; Karl-Heinz Bantel, Ludwigshafen; Heinz Eilingsfeld, Frankenthal, all of Germany

[73] Assignee: Badische Anilin- & Soda-Fabrik Aktiengesellschaft, Ludwigshafen (Rhine), Germany

[22] Filed: Jan. 9, 1973

[21] Appl. No.: 322,206

[30] Foreign Application Priority Data
Jan. 12, 1972 Germany.............................. 2201208
Nov. 24, 1972 Germany.............................. 2257674

[52] U.S. Cl. ........... 260/376; 260/315; 260/326.16; 260/332.3 R; 260/346.2 R; 260/347.8; 260/465 R; 260/476 R; 260/470; 260/473 R; 260/591; 260/592; 252/426
[51] Int. Cl.$^2$.................. C07C 49/68; C07C 49/80; C07C 49/84
[58] Field of Search...................... 260/591, 592, 376

[56] References Cited
OTHER PUBLICATIONS
Egyed et al., Chemical Abstracts, 63, 4199g (1965).
Pietrzyk et al., Analytical Chemistry, 38(11), 1508–1512 (1966).

*Primary Examiner*—D. Horwitz
*Attorney, Agent, or Firm*—Johnston, Keil, Thompson & Shurtleff

[57] ABSTRACT

A method of preparing aromatic ketones by reaction of aromatic compounds with acyl chlorides or acyl anhydrides in the presence of catalytic amounts of an aromatic polynitrosulfonic acid, and new aromatic ketones derived from an aromatic compound (as the acylatable compound) having at least two nuclear substituents, at least one of said substituents being a nitro group. Both the known and the new aromatic ketones obtainable are valuable intermediates for the production of dyes and pesticides.

8 Claims, No Drawings

PRODUCTION OF AROMATIC KETONES

This invention relates to a process for the manufacture of aromatic ketones by the reaction of aromatic compounds with acyl chlorides or anhydrides in the presence of catalytic amounts of an aromatic polynitrosulfonic acid.

Aromatic ketones are usually produced by the Friedel-Crafts reaction of acylatable aromatic compounds with acyl chlorides in the presence of a stoichiometric amount or an excess of a condensing agent such as aluminum chloride, iron(III) chloride or boron trifluoride.

It is an object of the present invention to provide a new and very simple method of producing aromatic ketones in good yields and high purity.

Another object of the invention is the new substances of the formula (I):

where $R^1$ is an aromatic or aliphatic radical and $R^2$ is an aromatic or heterocyclic radical which in that ring of the mono- or polynuclear radical adjacent to the carbonyl group contains 2, 3 or 4 substituents of which 1, 2 or 3 substituents are nitro groups.

A further object of the invention is to provide a new method of producing, in a simple manner and in good yields and high purity, said new aromatic keytones which are derived from an aromatic compound (as the acylatable compound) containing at least two nuclear substituents, at least one of said substituents being a nitro group.

We have found that, surprisingly, in the reaction of nuclearacylatable aromatic compounds with acyl chlorides or anhydrides in the presence of a catalyst at ambient or elevated temperature and atmospheric or superatmospheric pressure aromatic ketones are obtained in a simple manner and in very high yields and purity when the reaction is carried out with catalytic amounts of an aromatic sulfonic acid having at least two nitro groups, or a derivative thereof which is converted into such a sulfonic acid under the reaction conditions, the aromatic radical of the sulfonic acid if desired containing further substituents which are inert under the reaction conditions, preferably in positions in which the acidity of the sulfo group is enhanced, and at least two nitro groups being attached in the positions para and/or ortho to the sulfo group.

According to a particular embodiment of the invention the acylatable compound used is an aromatic compound having at least two nuclear substituents, at least one of the nuclear substituents being a nitro group.

When using 4-nitro-1,3-resorcinol dimethyl ether and o-toluyl chloride the reaction may be represented by the following equation:

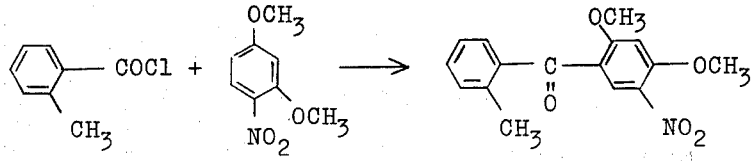

Surprisingly, the process of the invention lends itself to the acylation of compounds bearing nitro groups in the nucleus, and nitro-substituted acyl anhydrides and acyl chlorides may be used as acylating agents. The resulting nitrobenzophenones have not been obtainable by conventional Friedel-Crafts methods, for example using aluminum chloride, or only in low yields.

Examples of substituents which are inert under the reaction conditions and which may be contained in the catalytically active sulfonic acid in addition to two p- and/or o-nitro groups are above all further nitro, trifluoromethyl, cyano and/or methylsulfonyl groups. Obviously, the aromatic radical of the sulfonic acid may also contain other substituents that do not affect the acidity of the sulfonic acid group, e.g. lower alkyl or halogen.

Examples of catalytically active sulfonic acids are, in particular, benzene- and naphthalenemonosulfonic acids which contain at least two and preferably three nitro groups in positions in which the acidity of the sulfonic acid group is not affected.

Specific examples of suitable sulfonic acids are 2,4,6-trinitrobenzenesulfonic acid, 2,6-dinitro-4-cyanobenzenesulfonic acid, 2,4-dinitro-6-cyanobenzenesulfonic acid, 2,6-dinitro-4-trifluoromethylsulfonic acid, and 2,4,6-trinitronaphthalenesulfonic acid.

Most of the sulfonic acids to be used in the process are known substances. Those polynitrosulfonic acids which have not been described in the literature can be prepared by conventional methods, e.g. by reaction of the chloronitro compound with bisulfite.

The nitroarylsulfonic acids have high catalytic activity so that even very small amounts, as a rule from 0.1 to 3 mole%, based on the reactant which is present in a smaller amount, are adequate. Larger amounts, e.g. 5 to 10 mole%, are not harmful and in the case of components having low reactivity increase the yield, although they are usually considered uneconomical. In the reaction of certain reactive aromatics and acid chlorides, particularly at elevated temperature, less than 0.1 mole% may be adequate. However, in order to carry out the process in the most economical manner it has been found to be expedient to use approx. 1 to 3 mole%.

Depending on the reactivity of the reactants the acylation is carried out in a temperature range between room temperature and 300°C. The range of from 100° to 200°C is preferred.

The reactants are either used in a molar ratio, or one of the reactants, usually the substance to be acylated, is used in excess, depending on the relative cost.

The reaction may be carried out with or without solvents. If a solvent is used, it should be inert under the reaction conditions, e.g. nitrobenzene, trichlorobenzene, or aliphatic chlorinated hydrocarbons.

The method of the invention can be carried out continuously or batchwise. For continuous operation a cascade of vessels or a pressure vessel is used.

In batch operation the procedure is to mix the reactants and the catalyst in any sequence, the reaction usually being promoted by heating. The reaction as a rule is complete after 5 to 24 hours. The reaction mixture is worked up by conventional methods, usually by washing with water followed by distillation, or by direct distillation. When the reaction products are crystalline, the end products can often be isolated directly by crystallization.

The new process is, to all intents and purposes, as versatile as the Friedel-Crafts reaction. Suitable nuclear-acylatable aromatic compounds are therefore mono- or polynuclear aromatics which may be substituted by lower alkyl, especially of 1 to 4 carbon atoms, halogen, preferably chlorine, cyano, hydroxy, alkoxy, especially of 1 to 4 carbon atoms, cycloalkyl, especially cyclohexyl or cyclopentyl, carbalkoxy, especially of 2 to 4 carbon atoms, trifluoromethyl, or alkylmercapto, especially of 1 to 4 carbon atoms. Partially hydrogenated polynuclear systems may also be used. Examples are benzene, toluene, xylene, ethylbenzene, methyl p-tert.-butylbenzene, methylphenylindan, trimethylbenzene, anisol, phenol, o-, m- and p-cresol, diphenylmethane, diphenyl oxide, resorcinol dimethyl ether, anthracene, β-naphthol methyl ether, and tetrahydronaphthalene. For the purposes of the present invention the term aromatic compounds also includes heterocycles which are amenable to the Friedel-Crafts reaction, e.g. thiophene, furan, indoles, N-alkylcarbazoles and diphenylene oxide.

Suitable acylating agents for the new process are aromatic and aliphatic acyl anhydrides and preferably acyl chlorides. The acyl radicals may be unsubstituted or substituted, for example by lower alkyl of e.g. 1 to 4 carbon atoms, halogen, especially chlorine, alkoxy, e.g. of 1 to 4 carbon atoms, cyano, nitro, alkoxycarbonyl, e.g. of 2 to 4 carbon atoms, or acyl, e.g. of 2 to 4 carbon atoms.

Specific examples are acetic anhydride, phthalic anhydride, acetyl chloride, pivalyl chloride, ethylhexanoyl chloride, benzoyl chloride, p-, m- and p-toluyl chloride, o-, m- and p-nitrobenzoyl chloride, terephthalyl chloride, isophthalyl chloride and 1-nitroanthraquinone-2-carbonyl chloride.

When the acylatable compound used is an aromatic compound containing at least two nuclear substituents at least one of which is nitro, the latter preferably contains 2, 3 or 4 nuclear substituents, at least (and preferably) one of which is nitro. Suitable nuclear-acylatable aromatic compounds may therefore advantageously contain, in addition to nitro groups (preferably one nitro group), lower alkyl, especially of 1 to 4 carbon atoms, halogen, preferably chlorine, cyano, alkoxy, especially of 1 to 4 carbon atoms, cycloalkyl, especially cyclohexyl and cyclopentyl, carbalkoxy, especially of 2 to 4 carbon atoms, trifluoromethyl or alkylmercapto, especially of 1 to 4 carbon atoms. Partially hydrogenated polynuclear systems, e.g. those having an aromatic and a cycloaliphatic nucleus, may also be used. Specific examples are m-nitrotoluene, m-nitroxylene, m-nitroethylbenzene, 5-nitro-1-methyl-3-phenylindan, nitroanisol, o-nitro resorcinol dimethyl ether, and 5-nitro-8-methoxytetrahydronaphthalene. The term aromatic compounds as used herein is intended to include heterocycles which are amenable to the Friedel-Crafts reaction e.g. thiophene, furan, or indoles.

Suitable acylating agents are the said aromatic and aliphatic acyl anhydrides and preferably acyl chlorides whose acyl radicals may be unsubstituted or substituted, for example by the said substituents which preferably include nitro.

The new process is very easy to carry out and gives aromatic ketones in good yields and high purity. Separation and removal or recovery of the catalyst present no problems as in the conventional Friedel-Crafts acylations.

The aromatic ketones obtainable by this invention have mostly been available by the Friedel-Crafts reaction and are therefore known compounds. Both the said known compounds and the new aromatic ketones derived from an aromatic compound (as the acylatable compound) having at least two nuclear substituents, at least one of which is nitro group, are valuable intermediates for the manufacture of dyes and pesticides.

Of the new compounds of the formula

those are particularly important where $R^1$ is an aromatic or aliphatic radical and $R^2$ is an aromatic or heterocyclic radical which in the ring adjacent to the carbonyl group contains 2, 3 or 4 substituents of which one is preferably nitro.

The preferred substances have the formula:

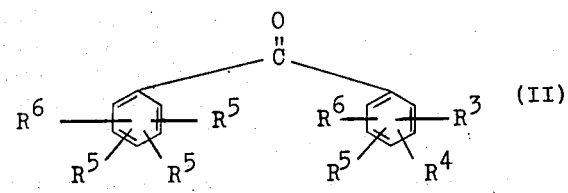

where $R^3$ is nitro, the individual radicals $R^4$, $R^5$ and $R^6$ are identical or different and each denotes chloro, cyano, alkoxy, cycloalkyl, carbalkoxy, alkylmercapto, alkyl or trifluoromethyl, $R^5$ may additionally denote hydrogen, and $R^6$ may additionally denote hydrogen, benzyl or phenoxy.

The invention is further illustrated by the following Examples. Parts are by weight unless otherwise specified. Parts by volume relate to parts by weight as the liter to the kilogram.

EXAMPLE 1

106 parts of p-xylene, 70.3 parts of benzoyl chloride and 2.0 parts of 2,4,6-trinitrobenzenesulfonic acid are boiled together under reflux for 6 hours. Fractionation of the reaction mixture gives 85 parts of 2,5-dimethylphenyl phenyl ketone having a boiling point of 165° to 175°C at 12 mm Hg. The yield is 81% of the theory.

EXAMPLE 2

53 parts of m-xylene, 62 parts of p-nitrobenzoyl chloride and 0.9 part of 2,4,6-trinitrobenzenesulfonic acid are heated together at 140°C for 5 hours. The reaction mixture is allowed to cool and then 500 parts of petroleum ether (boiling range 40° to 60°C) is added. 61.5 parts of 2,4-dimethylphenyl-4'-nitrophenyl ketone is obtained as precipitate. The product is identical with a sample prepared in conventional manner. The yield is 72% of the theory.

EXAMPLE 3

54 parts of anisol, 62 parts of p-nitrobenzoyl chloride and 0.9 part of 2,4,6-trinitrobenzenesulfonic acid are heated together at 155°C for 3 hours. The reaction mixture is allowed to cool and then 600 parts of petroleum ether (boiling range 40° to 60°C) is added. 68 parts of the isomers 4-methoxyphenyl-4'-nitrophenyl ketone and 2-methoxyphenyl-4'-nitrophenyl ketone is obtained as precipitate. The reaction product is identical with samples prepared by a conventional method. The yield is 73% of the theory.

EXAMPLE 4

A mixture of 78 parts of benzene, 70 parts of benzoyl chloride and 1.5 parts of 2,4,6-trinitrobenzenesulfonic acid is heated in a shaker autoclave at 160°C and superatmospheric pressure for 12 hours. Fractionation of the reaction mixture gives 58 parts of benzophenone having a melting point of 46.5° to 47.5°C. The yield is 64% of the theory.

EXAMPLE 5

64 parts of naphthalene, 46 parts of p-nitrobenzoyl chloride and 1.0 part of 2,4,6-trinitrobenzenesulfonic acid are melted together and heated at 180°C for 6 hours. The reaction mixture is then subjected to steam distillation in order to separate excess naphthalene. The residue, which is oily at first, is separated and stirred with petroleum ether (boiling range 40° to 60°C). 59 parts of 1-naphthyl-4'-nitrophenyl ketone is obtained. The product is identical with an authentic sample. The yield is 86% of the theory.

EXAMPLE 6

A mixture of 108 parts of anisol, 60 parts of trimethylacetyl chloride and 2.5 parts of 2,4,6-trinitrobenzenesulfonic acid is heated in a shaker autoclave at 170°C and autogenous pressure for 10 hours. Fractionation of the reaction mixture gives 53 parts of 4-methoxyphenyl-tert-butyl ketone having a boiling point of 148°C at 14 mm Hg. The yield is 68% of the theory.

EXAMPLE 7

54 parts of anisol, 78.8 parts of 1-nitroanthraquinone-2-acylchloride and 1.5 parts of 2,4,6-trinitrobenzenesulfonic acid are heated together at 155°C for 4 hours. The reaction mixture is allowed to cool, washed with ethanol and suction filtered. 85 parts of 1-nitroanthraquinonyl-2-4'-methoxyphenyl ketone is obtained which, after recrystallization from nitrobenzene, has a melting point of 298° to 300°C (with decomposition). The yield is 88% of the theory.

EXAMPLE 8

36.8 parts of nitro resorcinol dimethyl ether, 107.5 parts of o-toluyl chloride and 0.8 part of 2,4,6-trinitrobenzenesulfonic acid are heated together at 150°C for 5 hours. The reaction mixture is allowed to cool to room temperature and suction filtered and the filter cake is washed with 200 parts of cold ethanol. 46.0 parts (74% of the theory) of 2-methylphenyl-2',4'-dimethoxy-5'-nitrophenyl ketone having a melting point of 174° to 177°C is obtained.

EXAMPLE 9

75 parts of 4-nitroanisol, 211.5 parts of benzoyl chloride and 4 parts of 2,4,6-trinitrobenzenesulfonic acid are heated together at 170°C for 5 hours. The reaction mixture is allowed to cool and extracted several times with petroleum ether and the oily residue is crystallized from ethanol. 67 parts of 2-methoxy-5-nitrophenyl phenyl ketone having a melting point (ethanol) of 125° to 128°C is obtained.

EXAMPLE 10

54.9 parts of nitro resorcinol dimethyl ether, 127.4 parts of benzoyl chloride and 0.8 part of 2,4,6-trinitrobenzenesulfonic acid are heated together at 180°C for 6 hours. The reaction mixture is allowed to cool and suction filtered and the filter cake is washed with petroleum ether. 69.4 parts of 2,4-dimethoxy-5-nitrophenyl phenyl ketone having a melting point (ethanol) of 149° to 152°C is obtained.

We claim:

1. A compound of the formula

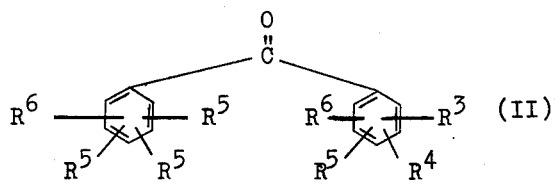

$R^3$ is nitro, $R^4$ is chloro, alkoxy of 1 to 4 carbon atoms alkylmercapto of 1 to 4 carbon atoms, alkyl 1 to 4 carbon atoms or trifluoromethyl $R_5$ is chloro, alkoxy of 1 to 4 carbon atoms alkylmercapto of 1 to 4 carbon atoms, alkyl of 1 to 4 carbon atoms, trifluoromethyl or hydrogen, $R_6$ is chloro, alkoxy of 1 to 4 carbon atoms, alkylmercapto of 1 to 4 carbon atoms, alkyl of 1 to 4 carbon atoms, trifluoromethyl, hydrogen, benzyl or phenoxy.

2. A process for the production of aromatic ketones which comprises: reacting
   a. a nuclear-acylatable aromatic compound selected from the group consisting of benzene, naphthalene, toluene, xylene, ethylbenzene, methyl p-tert.-butylbenzene, methylphenylindan, trimethylbenzene, anisol, phenol, o-, m- and p-cresol, diphenylmethane, diphenyl oxide, resorcinol dimethyl ether, anthracene, β-naphthol methyl ether, tetrahydronaphthalene, m-nitrotoluene, m-nitroxylene, m-nitroethylbenzene, 5-nitro-1methyl-3-phenylindan, nitroanisol, nitro resorcinol dimethyl ether, 5-nitro-8-methoxytetrahydronaphthalene, with the proviso that all of said compounds may bear inert substituents selected from the group consisting of lower alkyl, halogen, nitro, hydroxy, alkoxy, cycloalkyl, trifluormethyl, or alkylmercapto with
   b. an acyl chloride or acyl anhydride selected from the group consisting of phthalic, trimethylacetyl, acetyl, pivalyl, ethylhexanoyl, benzoyl, p-, m- and p-toluyl, o-, m- and p-nitrobenzoyl, terephthalyl, isophthalyl and 1-nitroanthraquinone-2-carbonyl with the proviso that all of said compounds may bear inert substitutents selected from the group consisting of lower alkyl, halogen, alkoxy, nitro, acyl of 2 to 4 carbon atoms, said reaction being carried out in the presence of a catalytic amount of a benzene- or naphthalenemonsulfonic acid which contains at least two nitro groups and may contain inert substituents selected from the group consisting of trifluoromethyl, cyano, methylsulfonyl, lower alkyl or halogen, said reaction further being carried out at a temperature between room temperature and 300°C.

3. A process as set forth in claim 2 wherein the reaction is carried out with nitroarylsulfonic acids in an amount of from 0.1 to 3 mole%, based on the reactant which is present in a smaller amount.

4. A process as set forth in claim 2 wherein the reaction is carried out in a temperature range of from 100° to 200°C.

5. A process as set forth in claim 2 wherein the reaction is carried out with the addition of a solvent which is inert under the reaction conditions.

6. A process as set forth in claim 2 wherein the aromatic radical of the nitroarylsulfonic acid catalyst bears, in addition to two nitro groups, one or more further nitro, trifluoromethyl, methylsulfonyl groups as substituents which are inert under the reaction conditions.

7. a process as set forth in claim 2 wherein the aromatic acylatable compound has at least two nuclear substituents at least one of which is a nitro group.

8. A process as set forth in claim 2 wherein the benzene sulfonic and naphthalene sulfonic acid catalysts bear three nitro groups in positions which enhance acidity of the sulfo group.

* * * * *

UNITED STATES PATENT AND TRADEMARK OFFICE
CERTIFICATE OF CORRECTION

PATENT NO. : 3,907,837
DATED : September 23, 1975
INVENTOR(S) : EFFENBERGER et al It is certified that error appears in the above-identified patent and that said Letters Patent are hereby corrected as shown below:

In Column 1, Line 29, delete "keytones" and substitute --ketones--

In Column 8, Claim 6, Line 9, delete "... trifluoromethyl, methylsulfonyl groups ..." and substitute --... trifluoromethyl or methylsulfonyl groups ...--

Signed and Sealed this

Sixteenth Day of November 1976

[SEAL]

Attest:

RUTH C. MASON
*Attesting Officer*

C. MARSHALL DANN
*Commissioner of Patents and Trademarks*